US009482868B2

(12) United States Patent
Sasaki et al.

(10) Patent No.: US 9,482,868 B2
(45) Date of Patent: Nov. 1, 2016

(54) VEHICULAR HEAD-UP DISPLAY DEVICE

(71) Applicant: DENSO CORPORATION, Kariya, Aichi-pref. (JP)

(72) Inventors: Tatsuya Sasaki, Chiryu (JP); Hideyuki Nakane, Nishio (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/425,437

(22) PCT Filed: Sep. 2, 2013

(86) PCT No.: PCT/JP2013/005161
§ 371 (c)(1),
(2) Date: Mar. 3, 2015

(87) PCT Pub. No.: WO2014/038171
PCT Pub. Date: Mar. 13, 2014

(65) Prior Publication Data
US 2015/0226964 A1 Aug. 13, 2015

(30) Foreign Application Priority Data

Sep. 7, 2012 (JP) ................................. 2012-197338

(51) Int. Cl.
*G02B 27/14* (2006.01)
*G02B 27/01* (2006.01)
*B60K 35/00* (2006.01)

(52) U.S. Cl.
CPC ........... *G02B 27/0101* (2013.01); *B60K 35/00* (2013.01); *G02B 27/01* (2013.01);
(Continued)

(58) Field of Classification Search
CPC .................................................. G02B 27/0172
USPC ................................ 359/630, 631, 629, 635
See application file for complete search history.

(56) References Cited

U.S. PATENT DOCUMENTS

| 4,691,153 A | 9/1987 | Nishimura |
| 5,296,868 A * | 3/1994 | Itami ................... G02B 27/0101 345/7 |

(Continued)

FOREIGN PATENT DOCUMENTS

| JP | S61185095 A | 8/1986 |
| JP | 2003335148 A | 11/2003 |

(Continued)

OTHER PUBLICATIONS

International Search Report and Written Opinion (in Japanese with English Translation) for PCT/JP2013/005161, mailed Oct. 29, 2013; ISA/JP.

(Continued)

*Primary Examiner* — Scott J Sugarman
*Assistant Examiner* — Travis Fissel
(74) *Attorney, Agent, or Firm* — Harness, Dickey & Pierce, P.L.C.

(57) ABSTRACT

A vehicular head-up display device is provided. The vehicular head-up display device includes: a reflector for reflecting display light, which is emitted from a display, to a windshield to display a virtual image; a stepper motor for rotating the reflector and a controller for controlling the stepper motor to control a rotation position of the reflector. When a driver changes a request position of the virtual image to a new position in a direction toward a reset position and the ignition switch is turned off, the controller rotates the stepper motor to change the position of the virtual image to the reset position and thereafter instructs the stepper motor to rotate by a specified angle corresponds to a hysteresis generated at a time of a change in the rotation direction of the reflector between a forward rotation direction and backward rotation direction.

4 Claims, 11 Drawing Sheets

(52) U.S. Cl.
CPC ... *G02B27/0149* (2013.01); *B60K 2350/2052* (2013.01); *B60K 2350/2065* (2013.01); *G02B 2027/014* (2013.01); *G02B 2027/0154* (2013.01)

(56) References Cited

U.S. PATENT DOCUMENTS

| | | | |
|---|---|---|---|
| 2005/0162340 A1* | 7/2005 | Nagano | B60K 35/00 345/7 |
| 2007/0085433 A1* | 4/2007 | Agematsu | H02K 5/1672 310/90 |
| 2008/0212196 A1 | 9/2008 | Watanabe et al. | |
| 2011/0170023 A1* | 7/2011 | Ishida | B60K 35/00 348/837 |
| 2011/0235185 A1 | 9/2011 | Kanamori | |

FOREIGN PATENT DOCUMENTS

| | | |
|---|---|---|
| JP | 2006-304511 A | 11/2006 |
| JP | 2008137490 A | 6/2008 |
| JP | 2009132221 A | 6/2009 |
| JP | 2011145393 A | 7/2011 |
| JP | 2011203680 A | 10/2011 |
| KR | 2011-0073328 A | 6/2011 |

OTHER PUBLICATIONS

Office Action dated Feb. 12, 2016 in corresponding Korean Application No. 10-2015-7005678 with English translation.

\* cited by examiner

ROTATION DIRECTION 1: INPUT SEQUENCE OF A, B, C, AND D.

ROTATION DIRECTION 2: INPUT SEQUENCE OF D, C, B, AND A.

VEHICULAR HEAD-UP DISPLAY DEVICE

CROSS REFERENCE TO RELATED APPLICATIONS

This application is a U.S. National Phase Application under 35 U.S.C. 371 of International Application No. PCT/JP2013/005161 filed on Sep. 2, 2013 and published in Japanese as WO 2014/038171 A1 on Mar. 13, 2014. This application is based on and claims the benefit of priority from Japanese Patent Application No. 2012-197338 filed on Sep. 7, 2012. The entire disclosures of all of the above applications are incorporated herein by reference.

TECHNICAL FIELD

The present disclosure relates to a vehicular head-up display device that uses a reflecting mirror to reflect an image displayed on a display onto a projection area of a vehicular windshield and allows a virtual image of the image projected onto the projection area to overlap with the vehicle foreground viewed from an eye point in the vehicle through the windshield.

BACKGROUND ART

For example, patent literature 1 describes a conventional vehicular head-up display device. The vehicular head-up display device (vehicular display device) according to patent literature 1 includes a concave mirror, a motor, and a controller. The concave mirror reflects display light, which comes from a projector, onto a vehicle's windshield. The motor rotates the concave mirror in response to input from a position adjustment switch to change a position of the concave mirror in rotation direction. The controller controls the motor operation.

While using the head-up display, a driver can manipulate the position adjustment switch to adjust the concave mirror to an intended rotation position. The controller operates the motor in response to an input signal from the position adjustment switch to change the concave mirror position in the rotation direction. The controller stores the adjusted concave mirror position as a final rotation stop position. When an ignition switch is turned off, the concave mirror position in the rotation direction is moved to a specified closed position by the controller. When the ignition switch is turned on, the concave mirror position in the rotation direction is returned to the previously adjusted final rotation stop position by the controller.

When the concave mirror is returned from the closed position to the final rotation stop position, the rotation direction to return the concave mirror may coincides with the final rotation direction to adjust the final rotation stop position. In such a case, the motor is supplied with the number of steps Sa to rotate the concave mirror between the closed position and the final rotation stop position to return the concave mirror.

When the concave mirror is returned from the closed position to the final rotation stop position, the rotation direction to return the concave mirror may be opposite to the final rotation direction to adjust the final rotation stop position. In such a case, the motor is supplied with the number of steps Sa supplemented with a specified number of extra steps Sb to rotate the concave mirror between the closed position and the final rotation stop position to return the concave mirror. Accordingly, the concave mirror is once rotated to a position exceeding the final rotation stop position, and the concave mirror is then backward rotated to return to the final rotation stop position.

This can protect the concave mirror against misalignment of the final rotation stop position, without the need for a special mechanism which reduces looseness in a mechanical movable portion or a gear backlash.

PRIOR ART LITERATURES

Patent Literature

Patent Literature 1: JP-2011-145393 A (corresponding to US 2011/0170023A)

SUMMARY OF INVENTION

In the patent literature 1, in order to prevent the positional error of the concave mirror, the motor is supplied with the number of steps Sa supplemented with a specified number of extra steps Sb according to the final rotation direction out of the rotation directions used to adjust the final rotation stop position. In this case, the concave mirror is once rotated to a position exceeding the final rotation stop position and then is rotated backward. This increases the process time to return the concave mirror to the final rotation stop position. Additionally, because this process is performed when the ignition key is turned on, it takes time before a display image is displayed through the windshield.

The present disclosure has been made in consideration of the foregoing. It is an object of the disclosure to provide a head-up display device that can prevent misalignment of a reflection means and allow a display image to be viewed in a short time at the start of next driving.

According to a first example of the present disclosure, a vehicular head-up display device mounted on a vehicle is provided. The vehicular head-up display device comprise a display that emits display light representing display information and a reflector that reflects the display light, which is emitted from the display, to a windshield to display a virtual image of the display information in a driver's forward visual field. The vehicular head-up display device further comprises a stepper motor that is directly or indirectly connected to the reflector and rotates the reflector in a rotation direction, a rotation direction spring that applies a force to a rotary shaft of the stepper motor in one rotation direction of the rotary shaft, an axis direction spring that applies a force to the rotary shaft in an axial direction of the rotary shaft, and a controller that controls the stepper motor to control a rotation position of the reflector in the rotation direction. The controller adjusts the rotation position of the reflector according to a request signal from a driver, so that a position of the virtual image in the windshield is changed to a request position requested by the driver. In response to turn off of an ignition switch, the controller changes the rotation position of the reflector, so that the position of the virtual image is changed to a predetermined reset position, and, in response to subsequent turn on of the ignition switch, the controller returns the rotation position of the reflector to a position corresponding to the request position of the virtual image by rotating the stepper motor in an opposite direction by a changed rotation angle defined as a rotation angel that corresponds to a change in position of the virtual image from the request position to the reset position. When the driver changes the request position to a new position in a direction toward the reset position and the ignition switch is turned off, the controller rotates the stepper motor to change the position of the virtual image to the reset position and thereafter instructs the stepper motor to perform a reverse operation, wherein in the reverse operation, the stepper motor rotates by a specified angle defined as an angle that corresponds to a hysteresis generated at a time of a change in the rotation direction of the reflector between forward rotation and backward rotation.

In the above vehicular head-up display device, when the driver changes the request position to a new position in a direction toward the reset position, the reflector adjusts the virtual image position to the request position. Suppose that while the virtual image position is changed to the reset position, the rotation direction of the stepper motor is controlled at the same rotation direction, and that when the ignition switch is turned on next time, the stepper motor is controlled to rotate in an opposite direction in order to move the virtual image position from the reset position to the request position by the reflector. In this case, this reverse operation causes a hysteresis effect and causes misalignment of the virtual image, despite a simple attempt to move the reflector to the request position by the changed rotation angle.

To address this difficulty, after the stepper motor is rotated so that the reflector changes the virtual image position from the request position to the reset position, the stepper motor is rotated in advance in the opposite direction by the specified angle corresponding to the hysteresis. Because of this, when the ignition switch is turned on next time, the hysteresis effect has been removed. Thus, becomes possible to prevent the misalignment of the reflector at the next turn on of the ignition switch, by rotating the stepper motor in the opposite direction by the changed rotation angle to change the virtual image position from the reset position to the request position.

In the above, the above-mentioned control is performed in response to turning off the ignition switch, and the stepper motor is merely rotated in the opposite direction by the changed rotation angle in response to turning on the ignition switch. Thereby, the reflector can be returned to a position corresponding to the request position from the reset position of the virtual image. A long processing time due to an extra operation like the prior art is absent and the display image is quickly displayed to the driver.

BRIEF DESCRIPTION OF DRAWINGS

The foregoing and other objects, features and advantages the present disclosure will become more apparent from the detailed description given below with reference to the accompanying drawings in which.

EMBODIMENTS FOR CARRYING OUT INVENTION

Figure 1:
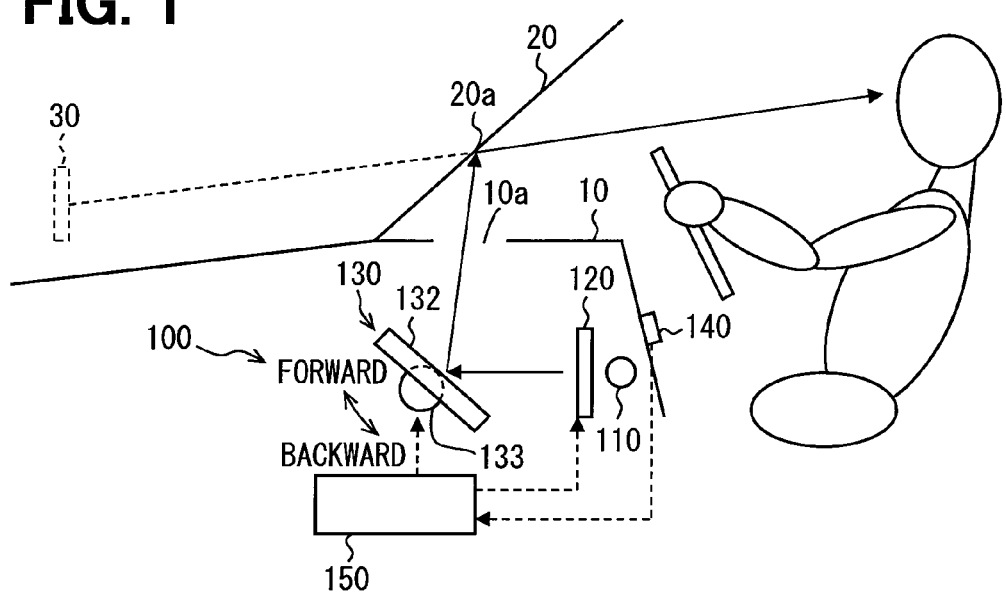
FIG. 1 is a schematic diagram illustrating an overall configuration of a vehicular head-up display device according to a first embodiment.

Embodiments of the present disclosure will be described with reference to the accompanying drawings. In embodiments, the same reference numerals are given to parts similar to those described in the preceding embodiment and a redundant description may be omitted for simplicity. If only a part of a configuration is described in an embodiment, other parts in the configuration may refer to those described in the preceding embodiment. Not only combinations of parts explicitly described as combinable in embodiments but also not-explicitly-described combinations of parts of embodiments are possible as long as such combinations have no confliction.

(First Embodiment)

A vehicular head-up display device 100 according to the first embodiment will be described with reference to FIGS. 1 through 11. As illustrated in FIG. 1, the vehicular head-up display device (Head-Up Display) 100 is applied to vehicles. A liquid crystal display 120 emits display light representing display information. The vehicular head-up display device 100 projects the display light onto a projection position 20*a* on a vehicle's windshield 20. The vehicular head-up display device 100 forms a display image 30 of the display information, so that the display image 30 appears ahead of the vehicle and on a line that connects a driver with the projection position 20*a*. The vehicular head-up display device 100 thereby allows the driver to view the display image 30 as a virtual image. Using the vehicular head-up display device 100, the driver can view the display image 30 and the vehicle's foreground overlapped with each other. The vehicular head-up display device 100 is hereinafter referred to as the HUD 100.

The windshield 20 is a front windshield of the vehicle. The windshield 20 employs laminated glass that is made of two glass plates and an intermediate film sandwiched between them. The windshield 20 has a slight curvature in the left-to-right direction when viewed from the vehicle top and has a slight curvature in the direction along the line of the windshield 20 when viewed from the vehicle side. The windshield 20 provides the same effect as a concave mirror and is capable of enlarging the display image 30 and displaying it in the distance.

As illustrated in FIG. 1, the HUD 100 includes a backlight 110, a liquid crystal display 120, a reflection device 130, a position adjustment switch 140, and a controller 150. The backlight 110, the liquid crystal display 120, the reflection device 130, and the controller 150 are provided as major components of the HUD 100 and are installed in an instrument panel 10, which extends downward from the bottom end of the windshield 20 toward the rear of a vehicle compartment. The position adjustment switch 140 is located for the driver to easily manipulate. For example, the position adjustment switch 140 is provided on the surface of the instrument panel 10 so as to face the driver. The top surface of the instrument panel 10 is provided with an aperture 10a that allows the display light from the reflection device 130 to pass through. The aperture 10a is provided with an unshown translucent dust-proof cover. The following describes in detail configurations of the HUD 100.

The backlight 110 is provided as a light-emitting element that, when energized, emits light to the liquid crystal display 120. For example, a light emitting diode (LED) is used for the backlight 110. The backlight 110 emits light along an optical axis for the liquid crystal display 120.

The liquid crystal display 120 emits display light representing the display information. A drive circuit of the controller 150 drives and controls the liquid crystal display 120. For example, the liquid crystal display 120 uses a TFT liquid crystal panel using a thin film transistor (TFT), a dual scan super twisted nematic (D-STN) display, or a twisted nematic (TN) segment liquid crystal display. The light emitted from the backlight 110 forms the display information on the surface of the liquid crystal display 120. The liquid crystal display 120 emits the display information as display light to the reflection device 130, which is located on an opposite side of the liquid crystal display 120 from the backlight 110. A surface of the liquid crystal display 120 for irradiating the display light faces in a vertical direction, for example. The liquid crystal display 120 is oriented so that an optical axis of the display light corresponds to the longitudinal direction of the vehicle (the irradiation direction corresponds to the longitudinal direction of the vehicle).

The liquid crystal display 120 generates the display information such as map information for a vehicular navigation system, the vehicle's current position information on a map, or information about the guidance to a destination, for example. Alternatively, the display information may contain vehicle information about a traveling vehicle such as a vehicle speed, an engine rotation speed, an engine coolant temperature, or a battery voltage. The liquid crystal display 120 can form one type or a combination of types of the above-mentioned display information on the surface of the liquid crystal display 120. Using an unshown selection switch, the driver can select which information to be displayed. The display information according to the embodiment signifies guidance information about a destination as illustrated in (2) of FIGS. 4 and (3) of FIG. 5.

Figure 2:
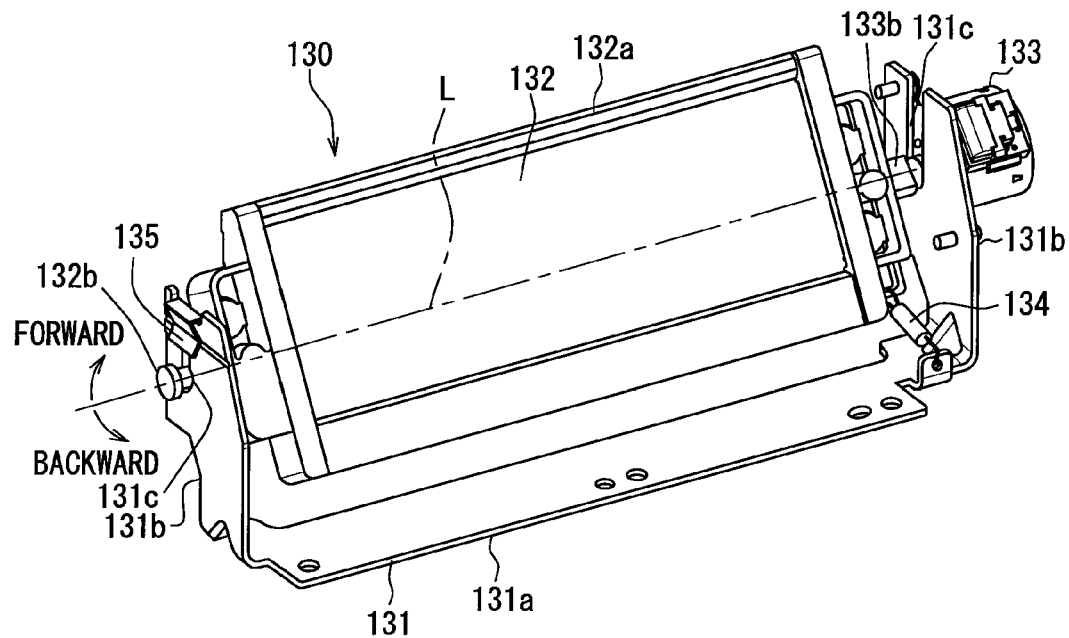
FIG. 2 is a perspective view illustrating a reflection device.

The reflection device 130 allows the display light from the liquid crystal display 120 to pass through the aperture 10a of the instrument panel 10 and reflect off the windshield 20 at the projection position 20a. As illustrated in FIG. 2, the reflection device 130 includes a support 131, a mirror portion 132, a stepper motor 133, a rotation direction spring 134, and an axis direction spring 135.

The support 131 is provided as a wide U-shaped member and supports the mirror portion 132 and the stepper motor 133. To form the support 131, a long and thin metal plate is bent at intermediate positions (two positions) in the longitudinal direction. The support 131 includes a bottom plate portion 131a corresponding to the bottom of the U-shape and a vertical plate portion 131b corresponding to each of both sides of the U-shape. Each vertical plate portion 131b has a recess portion 131c that is cut from the top to an intermediate position downward. The support 131 is positioned so that the width direction of the U-shape (the direction connecting the vertical plate portions 131b with each other) corresponds to the vehicle's width direction.

The mirror portion 132 exemplifies a reflector. The mirror portion 132 is formed by embedding a concave mirror in a long and thin, quadrangular metal frame 132a. The mirror portion 132 enlarges the display information from the liquid crystal display 120 and reflects the display information onto the windshield 20. The mirror portion 132 is positioned inside the support 131 so that the longitudinal direction of the mirror portion 132 corresponds to the vehicle's width direction. A rotary shaft 133b of the stepper motor 133 (to be described later) is connected to one end of the mirror portion 132 in the longitudinal direction so that the rotary shaft 133b corresponds to virtual center line L extending on the surface of the mirror portion 132 in the longitudinal direction. An outward protruding shaft portion 132b is integrally provided along virtual center line L at the other end of the mirror portion 132 in the longitudinal direction. Inserting the shaft portion 132b into the recess portion 131c allows the vertical plate portions 131b to rotatably support the shaft portion 132b (mirror portion 132).

Figure 3:
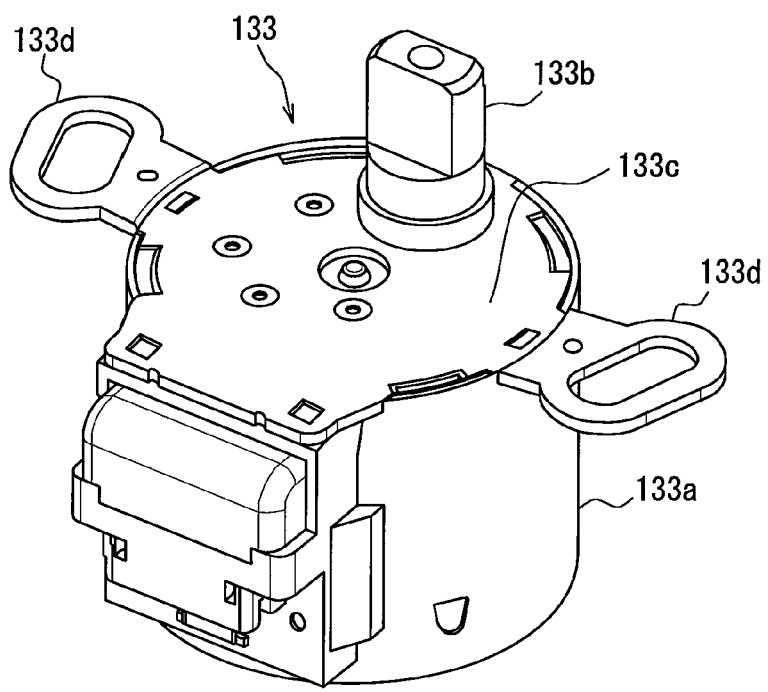
FIG. 3 is a perspective view illustrating a stepper motor.

As illustrated in FIGS. 2 and 3, the stepper motor 133 rotates the mirror portion 132 in the rotation direction. The stepper motor 133 includes a motor housing 133a containing a rotor, a stator, and a speed reducer mechanism that are not shown.

A permanent magnet is fixed to the rotor shaft. For example, the stator includes two-phase coils that are provided on an inner periphery of the motor housing 133a on an outer periphery side of the rotor. The stepper motor 133 is provided as a two-phase motor. Each of the two-phase coils further includes two coils (coils A and B and coils C and D). Energizing and exciting the coils A, B, C, and D in this order results in forward rotation of the shaft of the stepper motor 133. Energizing and exciting the coils D, C, B, and A in this order results in the backward rotation of the shaft of the stepper motor 133.

The speed reducer mechanism includes several reduction gears engaged in series. The speed reducer mechanism reduces the shaft output (rotation speed and torque) and transmits it to the rotary shaft 133b serving as a final output portion, so that the rotary shaft 133b generates low revolution and high torque. The rotary shaft 133b is formed to protrude from an axial-direction-end surface of the motor housing 133a.

The motor housing 133a is provided with two mounting stays 133d that radially-outwardly extend along the axial-direction-end face 133c from which the rotary shaft 133b protrudes. The mounting stays 133d fix the stepper motor 133 to one of the vertical plate portions 131b of the support 131. The rotary shaft 133b is inserted into the recess portion 131c and is positioned at one of the ends of the mirror portion 132 in the longitudinal direction. As described above, the rotary shaft 133b is connected to one of the ends of the mirror portion 132 in the longitudinal direction. Operating the stepper motor 133 can rotate the mirror portion 132 relative to the support 131 (vertical plate portion 131b) around virtual center line L.

When the stepper motor 133 rotates forward, the mirror portion 132 rotates clockwise (the "forward" direction in the drawings) as illustrated in FIGS. 1 and 2 and the display image 30 viewed across the windshield 20 moves upward on the windshield 20. When the stepper motor 133 rotates backward, the mirror portion 132 rotates counterclockwise (the "backward" direction in the drawings) as illustrated in FIGS. 1 and 2 and the display image 30 viewed across the windshield 20 moves downward on the windshield 20.

As described above, the stepper motor 133 contains the speed reducer mechanism and uses the rotary shaft 133*b* as a final output portion. In this case, the rotary shaft 133*b* is directly connected to the mirror portion 132. The stepper motor 133 may not contain the speed reducer mechanism. The speed reducer mechanism may be provided independently of the stepper motor (133). In this case, the shaft (rotary shaft) of the stepper motor (133) is connected to the mirror portion 132 via the speed reducer mechanism. The shaft is indirectly connected to the mirror portion 132.

The rotation direction spring 134 is an elastic body that applies a force to the rotary shaft 133*b* in one rotation direction. The rotation direction spring 134 may be a coil spring provided between the support 131 and the mirror portion 132, for example. The rotation direction spring 134 applies a force to the rotary shaft 133*b* in the direction (the above-mentioned clockwise direction) in which a driver-specified position (to be described later) leaves a reset position (to be described later), for example. The applied force eliminates looseness from the mirror portion 132 of the reflection device 130 in the rotation direction.

The axis direction spring 135 is an elastic body that applies a force to the rotary shaft 133*b* in one axial direction. The axis direction spring 135 is a leaf spring provided for the vertical plate portion 131*b* on an opposite side from the stepper motor 133, for example. The axis direction spring 135 applies a force to the rotary shaft 133*b* toward the motor end (the right side in FIG. 2). The applied force eliminates looseness from the mirror portion 132 of the reflection device 130 in the axial direction.

The position adjustment switch 140 is provided as an input portion to generate a request signal in response to the driver's manipulation. The request signal adjusts the position of the display image 30 on the windshield 20 upward or downward according to the driver's preference. The position adjustment switch 140 has a quadrangular switch surface, which faces against the driver, for example. Pressing the upper part of the switch surface generates a request signal to change the position of the display image 30 upward. Pressing the lower part of the switch surface generates a request signal to change the position of the display image 30 downward. The generated request signal is output to the controller 150.

The controller 150 is provided as a control means that controls display information for the liquid crystal display 120 and controls operation of the stepper motor 133 according to a request signal from the position adjustment switch 140 or an on/off signal from the ignition switch.

The controller 150 operates the stepper motor 133 according to a request signal from the position adjustment switch 140 to rotate the mirror portion 132. The controller 150 thereby adjusts a position (hereinafter referred to as a rotation position) of the mirror portion 132 in the rotation direction. The position of the display image 30 is thereby vertically adjusted with reference to the windshield 20, so that the display image 30 is adjusted to a driver-specified position requested by the driver (to be described in detail). The driver-specified position exemplifies a request position.

When the ignition switch is turned off, the controller 150 operates the stepper motor 133 to rotate the mirror portion 132. The position of the display image 30 with reference to the windshield 20 thereby changes from the driver-specified position to a predetermined reset position (to be described in detail). As illustrated in (2) of FIGS. 4 and (3) of FIG. 5, the embodiment configures the reset position to be lower than the driver-specified position toward the bottom end of the windshield 20. The reset position prevents the following situation. When the ignition switch is turned off and the vehicle is not driven by the driver, the sunlight reflects off the mirror portion 132 and the inside of the vehicle is reflected onto the windshield 20. The reset position exemplifies a reset position.

When the ignition switch is turned on for the next driving, the controller 150 backward rotates the stepper motor 133 by a changed rotation angle. The changed rotation angle is a rotation angle corresponding to a positional change in the display image 30 from the driver-specified position to the above-described reset position. The controller 150 thereby returns the rotation position of the mirror portion 132 to a position corresponding to the request position for the display image 30 (to be described in detail).

The HUD 100 is configured as described above. The following describes basic operation of the controller 150 on the HUD 100.

When the vehicle's ignition switch is turned on, the controller 150 determines display information to be displayed, based on the driver's instruction. The controller 150 also allows the drive circuit to form the display information on the liquid crystal display 120. The controller 150 operates the stepper motor 133 to rotate the mirror portion 132. The controller 150 thereby returns the position of the display image 30 from the reset position to the driver-specified position specified by the driver at the time of previous driving.

As illustrated in FIG. 1, the liquid crystal display 120 uses the light emitted from the backlight 110 to emits the display light representing the display information toward the mirror portion 132. The mirror portion 132 allows the display light emitted from the liquid crystal display 120 to reflect off the windshield 20 at the projection position 20*a* through the aperture 10*a* (dust-proof cover). The display light (display information) reflected at the projection position 20*a* is displayed (formed) as the display image 30 (virtual image) along a line that connects the driver with the projection position 20*a* and extends ahead of the vehicle (driver's forward visual field). As a result, the driver can view the display image 30.

The driver may manipulate the position adjustment switch 140 to generate a request signal to change the position of the display image 30. In this case, the controller 150 operates the stepper motor 133 to rotate the mirror portion 132 in the requested direction and adjust the position of the display image 30 to the driver-specified position. Specifically, when the request signal requests the downward position, the stepper motor 133 backward rotates to rotate the upper end of the mirror portion 132 in a direction to leave the driver as illustrated in FIG. 1. The display image 30 moves downward on the windshield 20 as illustrated in (1) of FIG. 4. When the request signal requests the upward position, the stepper motor 133 forward rotates to rotate the upper end of the mirror portion 132 in a direction to approach the driver as illustrated in FIG. 1. The display image 30 moves upward on the windshield 20 as illustrated in (1) of FIG. 5.

When the ignition switch is turned off, the controller 150 operates the stepper motor 133 to change the rotation position of the mirror portion 132. The controller 150 thereby changes the position of the display image 30 from the driver-specified position to the reset position. When the ignition switch is turned on, the controller 150 operates the stepper motor 133 to change the rotation position of the mirror portion 132. The controller 150 thereby changes the position of the display image 30 from the reset position to the driver-specified position.

Figure 6:
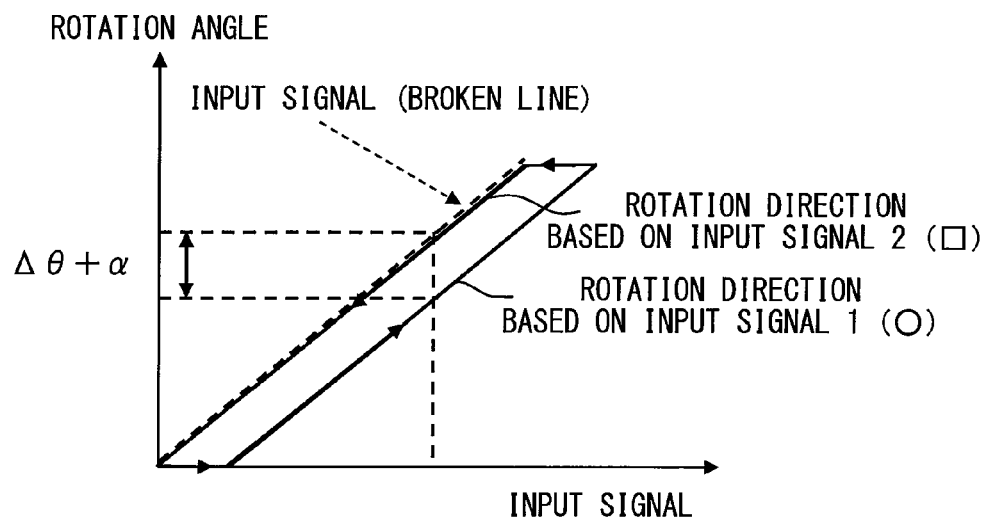
FIG. 6 is a graph illustrating hysteresis.
Figure 7:
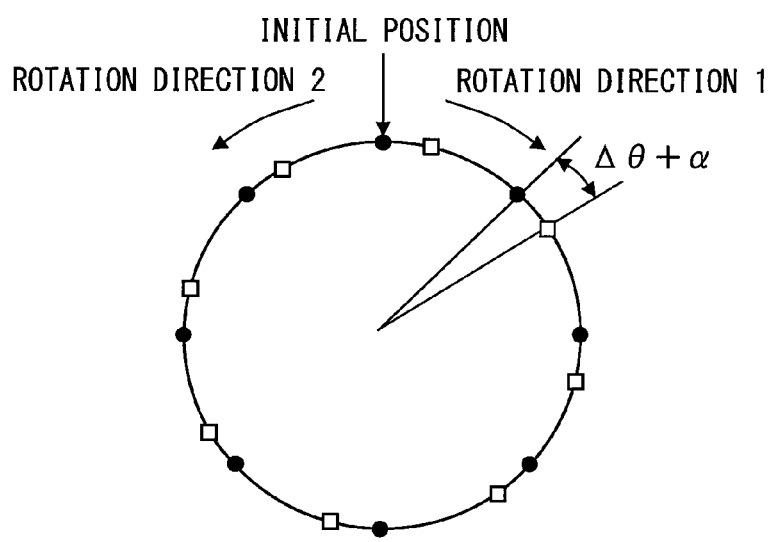
FIG. 7 is an explanatory diagram illustrating positional relationship of hysteresis corresponding to one revolution of the stepper motor.

The mirror portion 132 of the reflection device 130 is rotatable. The stepper motor 133 rotates the mirror portion 132. As illustrated in FIGS. 6 and 7, when the rotation direction of the mirror portion 132 is changed from the forward direction to the backward direction or from the backward direction to the forward direction, there occurs such a hysteresis phenomenon that the actual rotation angle (position in the rotation direction) is displaced from a control target rotation position specified by an input I signal. At a specified input signal position for example, the rotation angle in the rotation direction 1 differs from the rotation angle in the rotation direction 2 by an angle difference=Δθ+α. This angle difference represents the hysteresis.

Angle difference Δθ corresponds to the motor hysteresis that occurs due to a magnetic hysteresis in the stepper motor 133 or a backlash in the speed reducer mechanism (several gears), for example. Angle difference α corresponds to the other hystereses that occur due to a force applied to the rotation direction spring 134, a force applied to the axis direction spring 135, or a friction coefficient varying between the mirror portion 132 and the support 131 (vertical plate portion 131b) according to the weight of the mirror portion 132, for example. Therefore, angle difference=Δθ+α is assumed to be the hysteresis that may occur on the reflection device 130 as a whole.

During the above-mentioned operation of the HUD 100, the reset position is predetermined beneath the driver-specified position, namely, to the bottom of the windshield 20. In this case, when the display image 30 is adjusted to the driver-specified position according to the driver's preference, the last movement direction of the display image 30 before the turn off of the ignition switch may be an upward direction, which is a direction away from the reset position (the driver-specified position may be changed to leave the reset position) as illustrated in (1) of FIG. 5. In such a case, the stepper motor 133 changes its rotation direction in the following way. After the display image 30 is adjusted to the driver-specified position, the rotation direction of the stepper motor 133 is once changed to change the display image 30 into the reset position ((2) in FIG. 5), and, the rotation direction of the stepper motor 133 is revered to return the display image 30 to the driver-specified position from the reset position when the ignition switch is turned on next time ((3) in FIG. 5).

When the rotation direction of the stepper motor 133 is changed twice as described above, each reversing of the rotation direction causes the hysteresis. These hystereses counterbalance each other. Therefore, when the stepper motor 133 rotates in an opposite direction by a changed rotation angle corresponding to the change from the driver-specified position to the reset position, the position of the display image 30 is returned from the reset position to the driver-specified position, which was specified during the preceding driving ((3) in FIG. 5). This prevents the driver from having a sense of discomfort.

Figure 4:
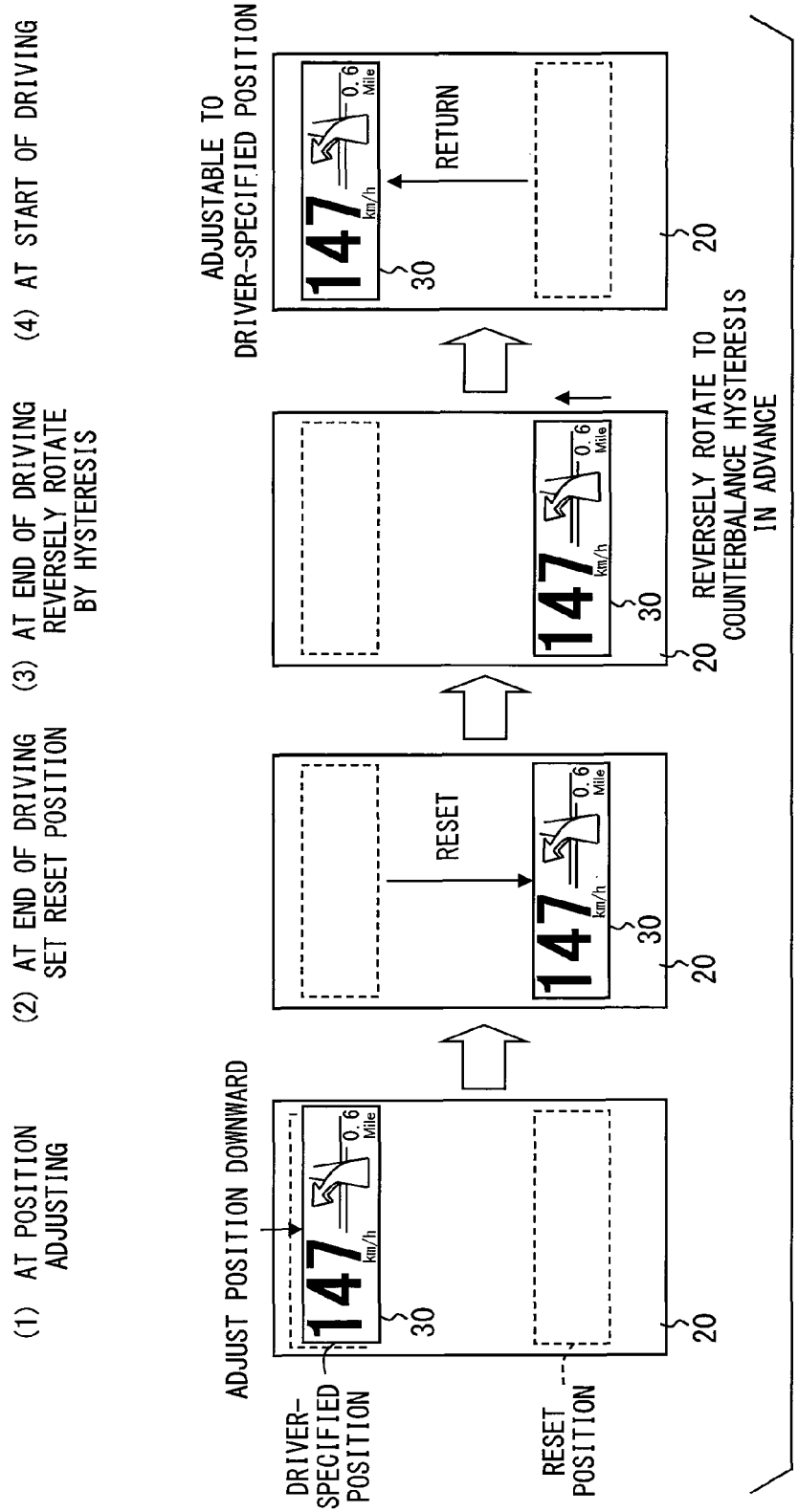
FIG. 4 is an explanatory diagram illustrating positions of a display image when a reset position is a downward position and a display image position is adjusted downward.

However, when the reset position is beneath the driver-specified position, namely, to the bottom of the windshield 20 and when the display image 30 is adjusted to the driver-specified position according to the driver's preference, the last movement direction of the display image 30 before the turn off of the ignition switch may be a downward direction, which is a direction toward the reset position (the driver-specified position may be changed to approach the reset position) as illustrated in (1) of FIG. 4. In such a case, the stepper motor 133 changes its rotation direction in the following way. The display image 30 is changed to the reset position from the driver-specified position, and thereafter, the rotation direction of the stepper motor 133 is changed one time to return to the driver-specified position from the reset position when the ignition switch is turned on next time ((3) in FIG. 4).

In this case, the hysteresis occurs once when the rotation direction is changed to change from the reset position to the driver-specified position. Due to this hysteresis, when the stepper motor 133 attempts to return the display image 30 to the driver-specified position from the reset position by rotating in an opposite direction by a changed rotation angle corresponding to the change from the driver-specified position to the reset position, the display image 30 is returned to a position deviated from the driver-specified position, which was specified during the preceding driving. This provides the driver with a sense of discomfort.

Figure 8:
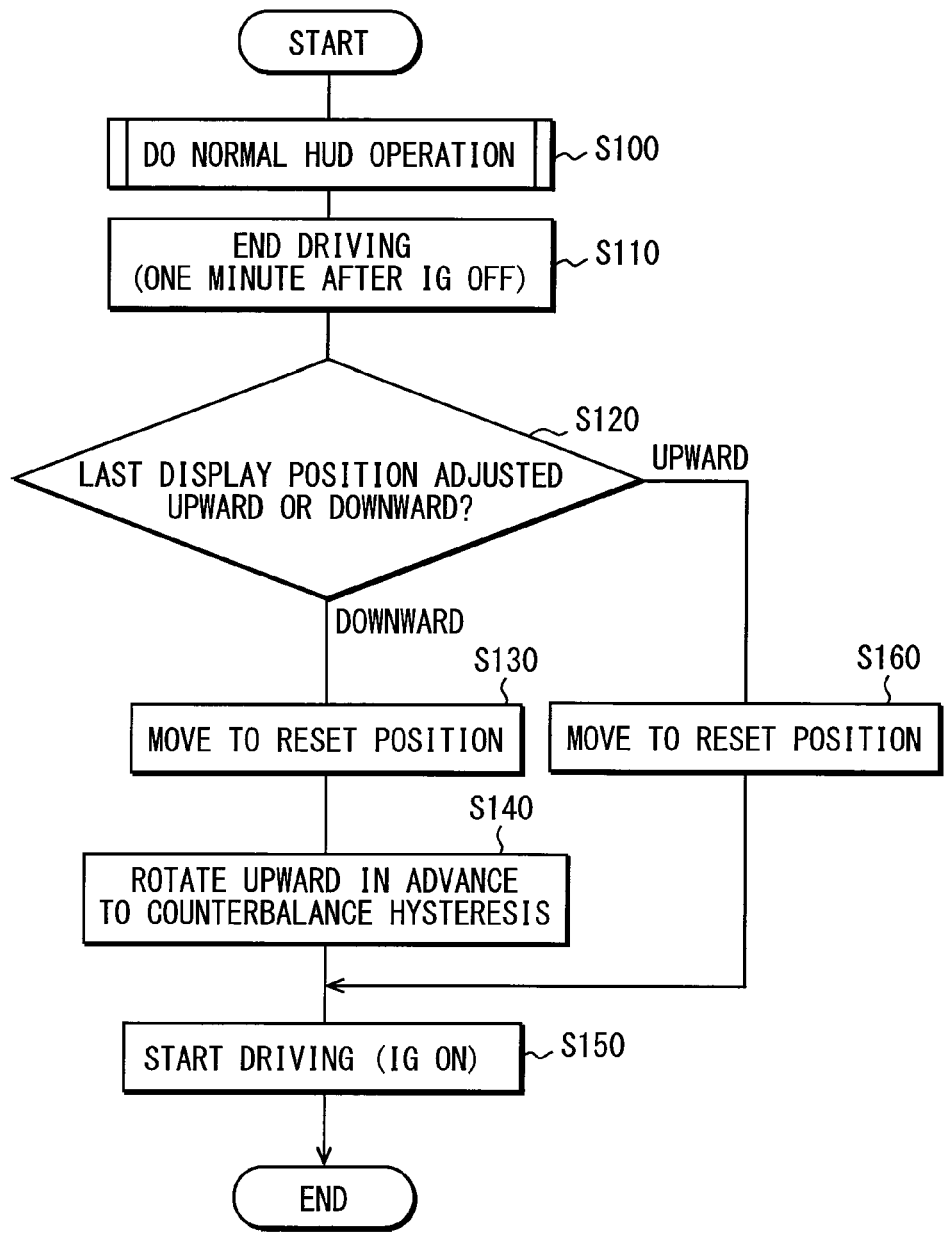
FIG. 8 is a flowchart illustrating a control process performed by a controller according to the first embodiment.

To avoid this positional error, the controller 150 controls the stepper motor 133 (mirror portion 132) based on a flowchart as illustrated in FIG. 8.

The ignition switch is turned on to make the vehicle ready for driving. At S100, the controller 150 performs the normal HUD operation. This operation has the same contents as the basic operation of the HUD 100 described above. The controller 150 provides control to determine and generate the display information on the liquid crystal display 120. Based on a request signal from the position adjustment switch 140, the controller 150 operates the stepper motor 133 to adjust the rotation position of the mirror portion 132.

When the driver turns off the ignition switch to end the driving, the controller 150 at S110 acquires a signal to turn off the ignition switch. After a predetermined time (e.g., one minute) elapsed from the time to acquire the signal to turn off the ignition switch, the controller 150 proceeds to S120 and determines whether the direction in which the position of the display image 30 was last adjusted based on a request signal from the driver before the turn off of the ignition is "the upward direction" or "the downward direction", based on a request signal from the driver If the above-mentioned determination results in the upward direction ((1) in FIG. 4), the controller 150 proceeds to S130 to operate the stepper motor 133 and change the rotation position of the mirror portion 132 ((2) in FIG. 4) so that the position of the display image 30 on the mirror portion 132 changes from the driver-specified position to the reset position. At this time, the mirror portion 132 rotates by the changed rotation angle.

Figure 9:
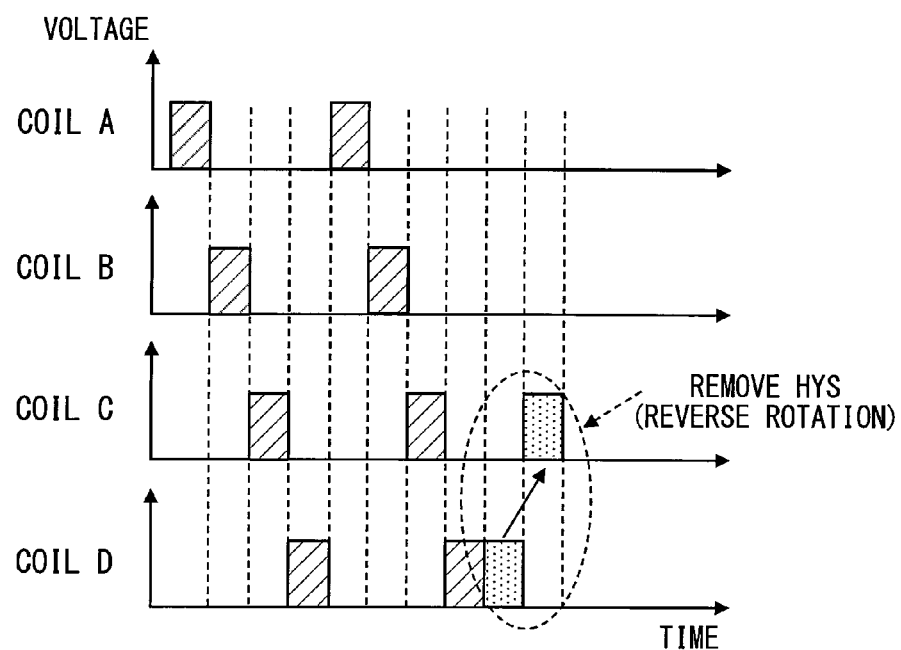
FIG. 9 is an explanatory diagram illustrating how to excite a coil of the stepper motor in order to prevent hysteresis.
Figure 10:
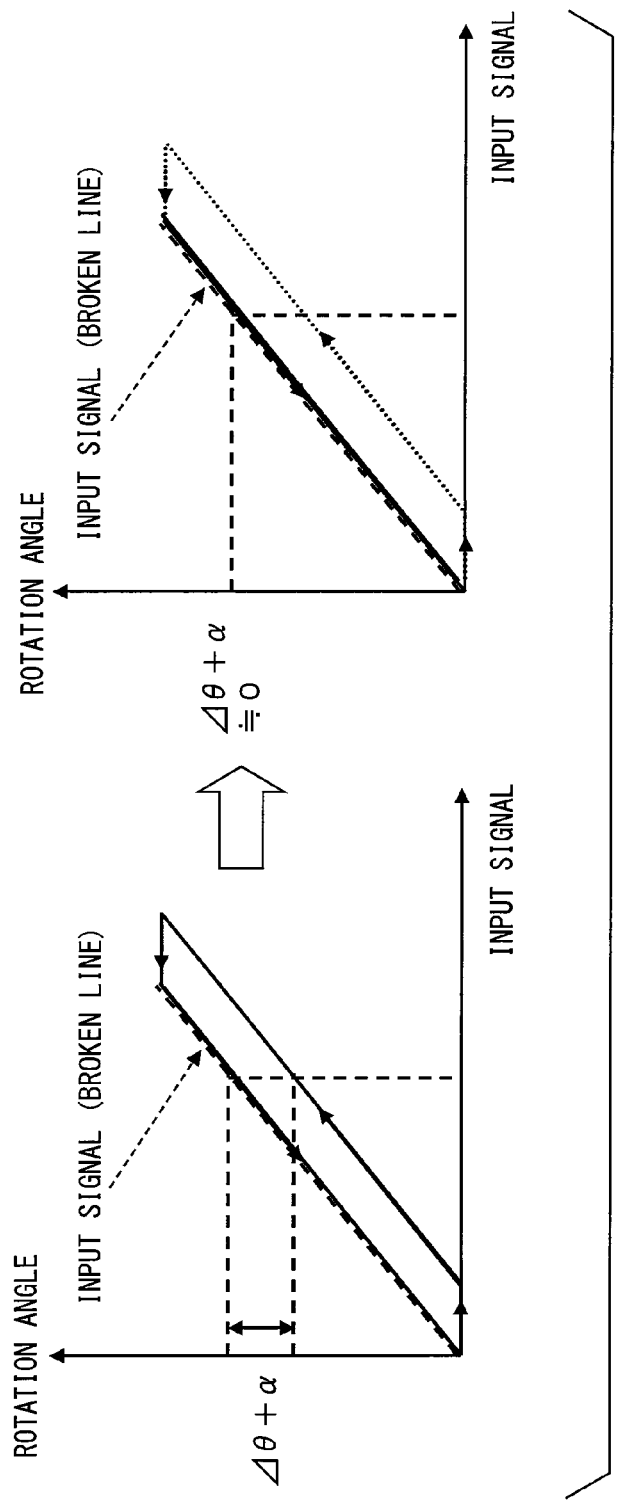
FIG. 10 is an explanatory diagram illustrating an occurrence of hysteresis at the left side and removal of hysteresis at the right side.

At S140, the controller 150 instructs the stepper motor 133 to perform a reverse operation in advance. In the reverse operation, the stepper motor 133 rotates by a specified angle corresponding to the hysteresis ((3) in FIG. 4) in an opposite direction, which is the direction in which the stepper motor 133 was rotated at S130. Theoretically, the specified angle corresponds to the above-mentioned angle difference Δθ+α. However, the stepper motor 133 according to the embodiment uses four coils A, B, C, and D. The shaft stepwise rotates in increments of 90 degrees. For this reason, the minimum stepwise rotation angle is set to 90 degrees to satisfy angle difference Δθ+α. The embodiment configures the specified angle as 180 degrees corresponding to two stepwise rotations. At S130, the controller 150 rotates the stepper motor 133 by exiting coils A, B, C, and D in this order as illustrated in FIG. 9 when the position of the display image 30 is changed from the driver-specified position to the reset position. At S140, the controller 150 rotates the stepper motor 133 by exciting coils D and C in this order for two stepwise rotations. This rotates the stepper motor 133 in the opposite direction by the specified angle to be ready for operation when the ignition switch is turned on next time.

When the ignition switch is turned on for the next driving, the controller 150 at S150 rotates the stepper motor 133 by the same changed rotation angle as at S130 in the same direction as the direction in the reverse operation of the stepper motor 133 at S140. This returns the rotation position of the mirror portion 132 to the driver-specified position from the reset position ((4) in FIG. 4).

Figure 5:
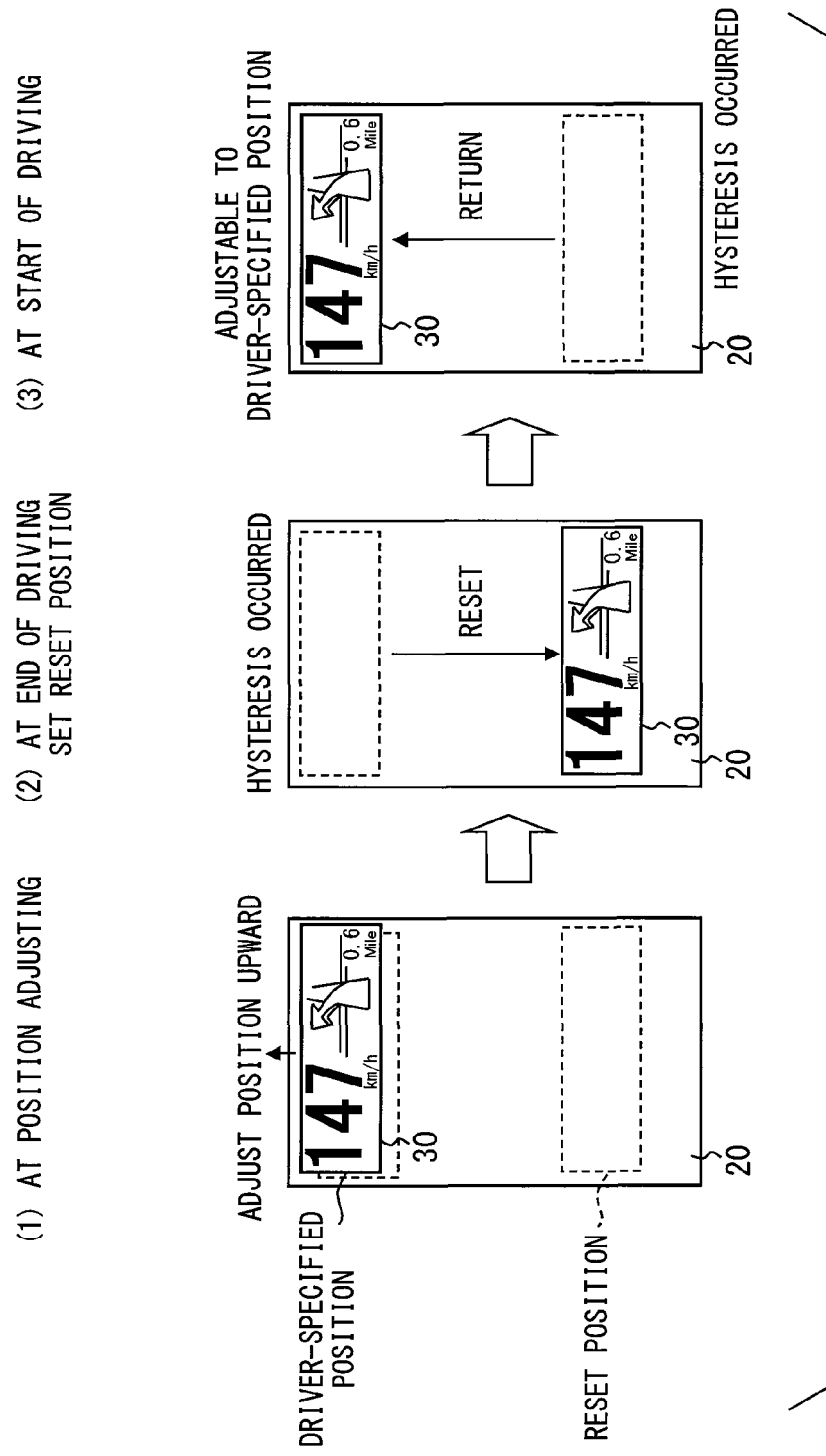
FIG. 5 is an explanatory diagram illustrating positions of a display image when the reset position is a downward position and a display image position is adjusted upward.

At S120, the controller 150 may determine that the direction in which the position of the display image 30 was last adjusted is "the upward direction" ((1) in FIG. 5). In this case, at S160 similar to S130, the controller 150 operates the stepper motor 133 to change the rotation position of the mirror portion 132 ((2) in FIG. 4) so that the position of the display image 30 on the mirror portion 132 changes from the driver-specified position to the reset position. The controller 150 then proceeds to S150 described above ((3) in FIG. 5).

At S120, the controller 150 may determine that the position of the display image 30 was last adjusted "upward." In this case, as illustrated in (1) through (3) of FIG. 5, the operation of the stepper motor 133 cancels a hysteresis effect as described above. Therefore, the controller 150 does not control (inhibits) the reverse operation of the stepper motor 133 as described at S140, although the controller 150 changes the position of the display image 30 from the driver-specified position to the reset position at S160.

As described above, the driver may change the driver-specified position for the display image 30 in the direction toward the reset position. In other words, the mirror portion 132 may rotate to adjust the display image 30 to the driver-specified position in the same direction as when the mirror portion 132 rotates to change the position of the display image 30 to the reset position. In such a case, the controller 150 according to the embodiment rotates the stepper motor 133 to change the rotation position of the mirror portion 132 so that the display image 30 is set to the reset position when the ignition switch is turned off next time. In addition, the controller 150 instructs the stepper motor 133 to perform the reverse operation to rotate in the opposite direction by the specified angle corresponding to the hysteresis of the mirror portion 132 (S140).

Because of this, when the ignition switch is turned on next time, the hysteresis effect has been counterbalanced. Therefore, when the ignition switch is turned on next time, the stepper motor 133 rotates in the opposite direction by a changed rotation angle toward the position corresponding to the driver-specified position from the reset position for the display image 30. This can prevent the mirror portion 132 from being misaligned ($\Delta\theta+\alpha \approx 0$) as illustrated in (1) and (2) of FIG. 10.

In response to turning off the ignition switch, the above-mentioned control is performed, and in response to turning on the ignition switch, the stepper motor 133 just rotate in the opposite direction by the changed rotation angle to return the mirror portion 132 to the position corresponding to the driver-specified position from the reset position for the display image 30. Therefore, the display image 30 is quickly displayed to the driver because a long processing time due to an extra operation like the prior art is absent.

The stepper motor 133 rotates in the opposite direction by the specified angle, namely, the sum of rotation angles ($\Delta\theta+\alpha$). Rotation angle ($\Delta\theta$) corresponds to the motor hysteresis occurring when the stepper motor 133 changes its rotation direction from the forward operation to the backward operation, or vice versa. Rotation angle ($\alpha$) corresponds to the other hystereses resulting from a force applied to the rotation direction spring 134, a force applied to the axis direction spring 135, and the weight of the mirror portion 132.

The controller 150 can control the reverse operation of the stepper motor 133 in consideration of hystereses according to the entire configuration of the HUD 100 and reliably prevent the mirror portion 132 from having a positional error.

The driver may change the driver-specified position for the display image 30 in the direction away from the reset position. In other words, the mirror portion 132 may rotate to adjust the display image 30 to the driver-specified position in a direction opposite to a direction in which the mirror portion 132 rotates to change the position of the display image 30 to the reset position. In such a case, the controller 150 does not control (inhibits) the reverse operation of the stepper motor 133.

In this case, the rotation direction of the stepper motor 133 is once changed while the mirror portion 132 is adjusted to the driver-specified position and is changed to the reset position, and, the rotation direction of the stepper motor 133 is again changed to move the mirror portion 132 from the reset position to the driver-specified position when the ignition switch is turned on next time. Thus, the stepper motor 133 changes the rotation direction twice to change to the reset position and to change to the driver-specified position. The two rotation direction changes cancel an effect of misalignment due to the hysteresis. In this case, the above-mentioned reverse operation is unneeded. Preventing the control over the reverse operation can eliminate unnecessary control and reliably prevent the misalignment.

(Second Embodiment)

Figure 11:
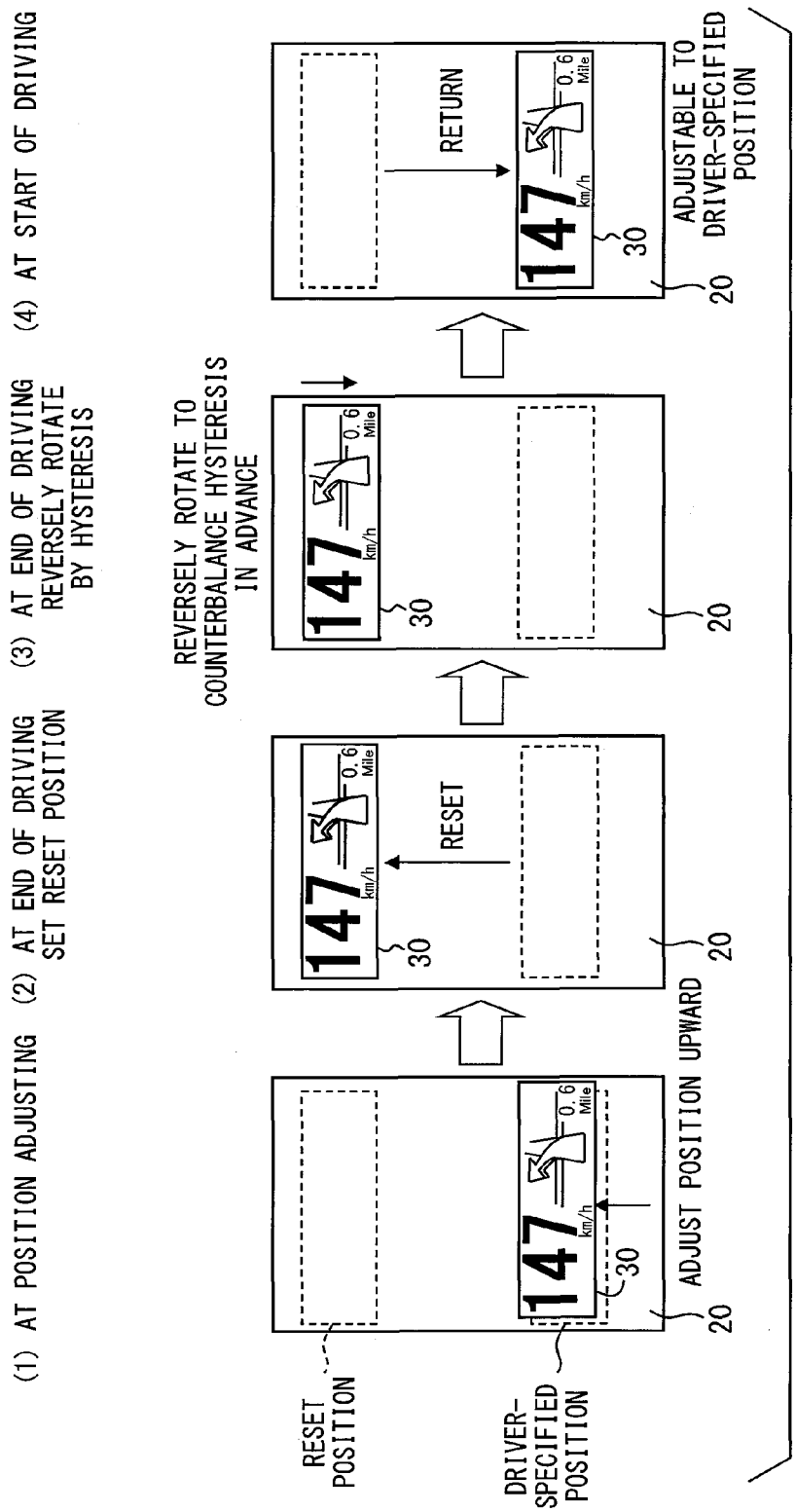
FIG. 11 is an explanatory diagram illustrating positions of a display image according to a second embodiment when the reset position is an upward position and a display image position is adjusted upward.
Figure 12:
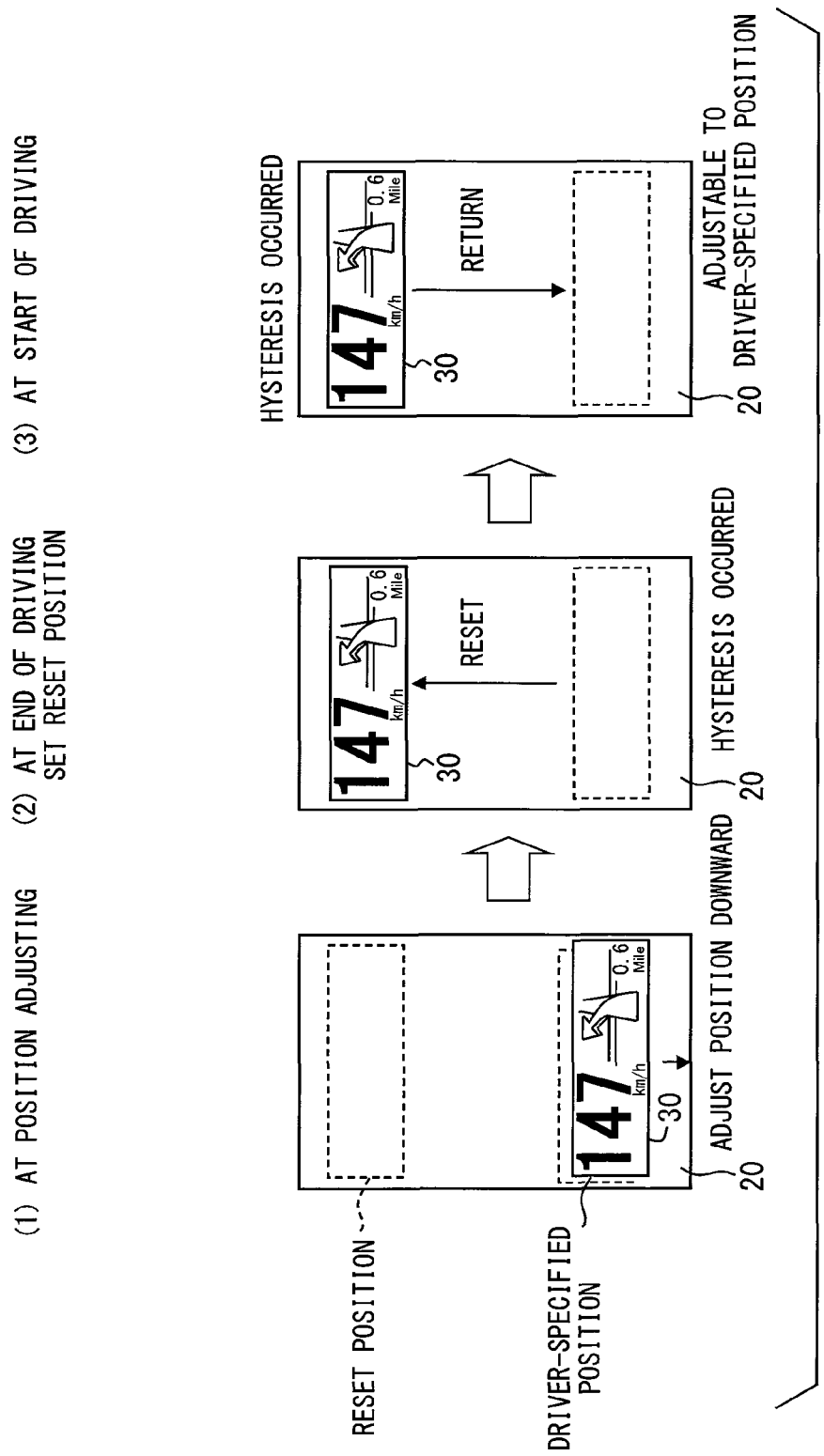
FIG. 12 is an explanatory diagram illustrating positions of a display image according to the second embodiment when the reset position is an upward position and a display image position is adjusted downward.
Figure 13:
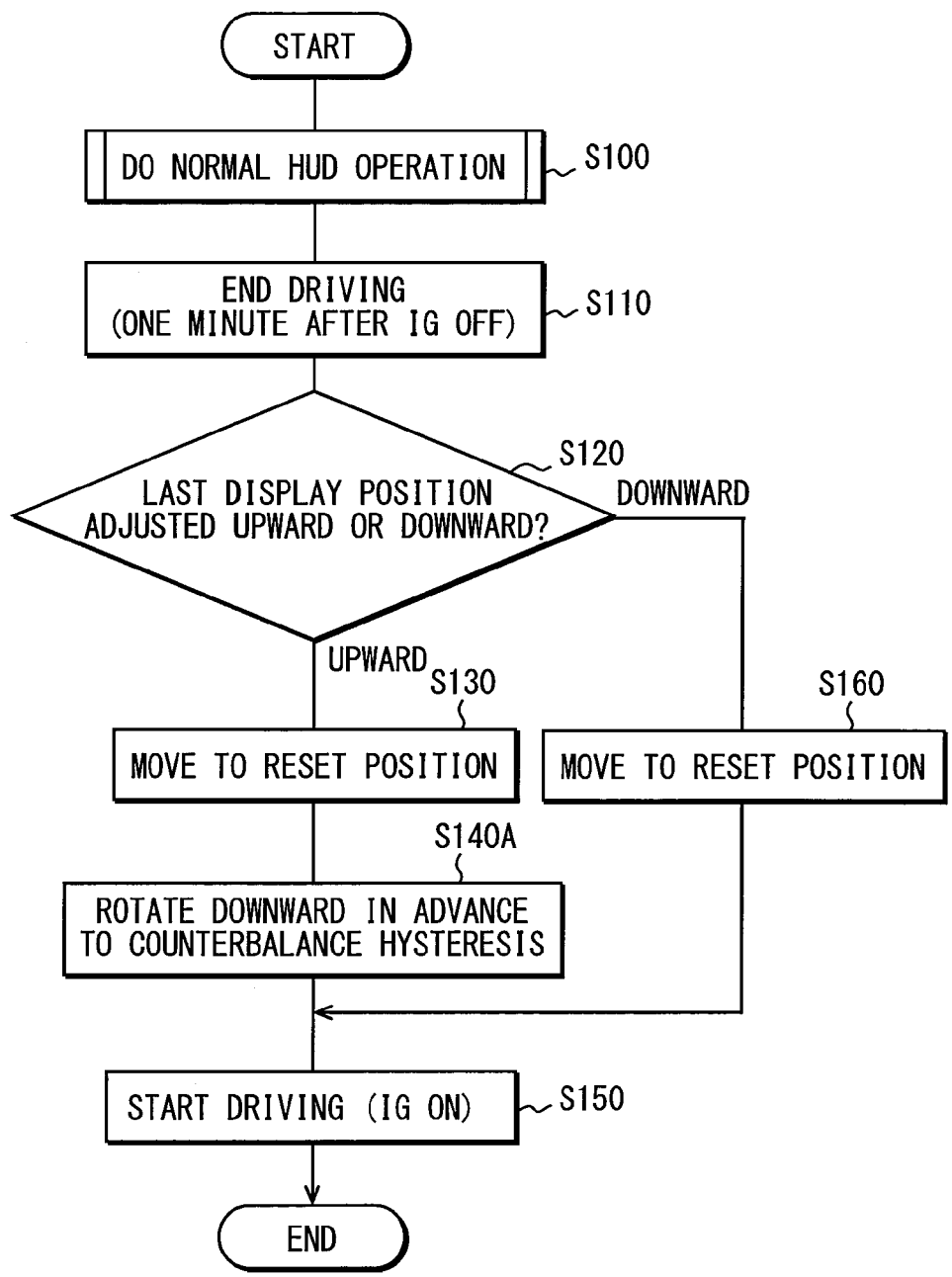
FIG. 13 is a flowchart illustrating a control process performed by a controller according to the second embodiment.

FIGS. 11 through 13 illustrate the HUD 100 (positions of the display image 30 and a flowchart) according to the second embodiment. The second embodiment differs from the first embodiment in the contents of the control performed by the controller 150.

As illustrated in (1) of FIGS. 11 and (1) of FIG. 12, the reset position according to the second embodiment is predetermined above the driver-specified position and is located to the upper end of the windshield 20. As illustrated in FIG. 11, the display image 30 is moved upward to adjust the driver-specified position so that the driver-specified position is changed in the direction to approach the reset position. In this case, the rotation direction of the stepper motor 133 (mirror portion 132) for the adjustment coincides with the rotation direction of the stepper motor 133 (mirror portion 132) to change the display image 30 from the driver-specified position to the reset position. As illustrated in FIG. 12, the display image 30 is moved downward to adjust the driver-specified position so that the driver-specified position is changed in the direction to leave the reset position. In this case, the rotation direction of the stepper motor 133 (mirror portion 132) is opposite to the rotation direction of the stepper motor 133 (mirror portion 132) to change the display image 30 from the driver-specified position to the reset position.

The control contents of S100 through S130, S150, and S160 of the flowchart in FIG. 13 equal those of the flowchart in FIG. 8 according to the first embodiment. However, results of the determination at S120, "upward" and "downward," are reversed in FIGS. 8 and 13. The directions in the reverse operation are opposite to each other at S140 and S140A.

At S120, the controller 150 may adjust the display image 30 upward to adjust the driver-specified position. In this case, the controller 150 performs S130 and S140A and proceeds to S150. As illustrated in (2) of FIG. 11, the controller 150 changes the position of the display image 30 from driver-specified position to the reset position. As illustrated in (3) of FIG. 11, the controller 150 then instructs the stepper motor 133 to perform the reverse operation, for counterbalancing the hysteresis in advance. This enables to prevent the display image 30 from being misaligned as illustrated in (4) of FIG. 11 when the next operation starts.

Suppose a case where the ignition switch is turned off, the control over the reverse operation is performed, and then the ignition switch is turned on. In such a case, similarly to the first embodiment, just rotating the stepper motor 133 in the opposite direction by the changed rotation angle can return the mirror portion 132 to the driver-specified position from the reset position. A long processing time due to an extra operation like the prior art is eliminated. The display image 30 is quickly displayed to the driver.

At S120, the controller 150 may adjust the display image 30 downward to adjust the driver-specified position. In this case, the controller 150 performs only S160 and proceeds to S150. As illustrated in (2) of FIG. 12, the controller 150 changes the position of the display image 30 from the driver-specified position to the reset position and then does not instruct the reverse operation of the stepper motor 133 to counterbalance the hysteresis. The hysteresis due to the rotation direction change of the stepper motor 133 as illustrated in (1) and (2) of FIG. 12 and the hysteresis due to the rotation direction change of the stepper motor 133 as illustrated in (2) and (3) of FIG. 12 counterbalance effects of both hystereses. This enables to prevent the display image 30 from being misaligned as illustrated in (3) of FIG. 12 when the next operation starts.

(Other Embodiments)

According to the first and second embodiments, the stepper motor 133 is provided as a two-phase motor including coils A through D but is not limited thereto. The number of coil phases may be increased. Increasing the number of coil phases can decrease a rotation angle per stepwise rotation. When controlled to perform the reverse operation, the stepper motor 133 can be given an angle approximate to the angle corresponding to the hysteresis.

As described above, the reflection device 130 reflects the display light from the liquid crystal display 120. The display light from the liquid crystal display 120 may once reflect off a plane mirror and then may be emitted to the reflection device 130.

As described above, the liquid crystal display (display) 120 uses a TFT liquid crystal panel, a D-STN display, or a TN segment liquid crystal display but is not limited thereto. The liquid crystal display 120 may be provided as an electroluminescent or self-luminous display. The liquid crystal display 120 may be also provided as a laser projector to scan lasers.

According to the above-mentioned embodiments, the rotation direction spring 134 applies a force to the rotary shaft 133b in the direction that allows the driver-specified position to leave the reset position. The rotation direction spring 134 may apply a force to the rotary shaft 133b in the reverse direction.

While there have been exemplified the embodiments and configurations according to the present disclosure, embodiments and configurations according to the disclosure are not limited to the above-mentioned embodiments and configurations. The scope of the embodiments and configurations according to the disclosure also includes embodiments and configurations resulting from appropriately combining different embodiments and configurations with the disclosed technical elements.

What is claimed is:

1. A vehicular head-up display device that is mounted on a vehicle, the vehicular head-up display device comprising:
   a display that emits display light representing display information; and
   a reflector that reflects the display light, which is emitted from the display, to a windshield to display a virtual image of the display information in a driver's forward visual field,
   the vehicular head-up display device further comprising:
   a stepper motor that is directly or indirectly connected to the reflector and rotates the reflector in a rotation direction;
   a rotation direction spring that applies a force to a rotary shaft of the stepper motor in one rotation direction of the rotary shaft;
   an axis direction spring that applies a force to the rotary shaft in an axial direction of the rotary shaft; and
   a controller that controls the stepper motor to control a rotation position of the reflector in the rotation direction,
   wherein:
   the controller adjusts the rotation position of the reflector according to a request signal from a driver, so that a position of the virtual image in the windshield is changed to a request position requested by the driver;
   in response to turn off of an ignition switch, the controller changes the rotation position of the reflector, so that the position of the virtual image is changed to a predetermined reset position, and, in response to subsequent turn on of the ignition switch, the controller returns the rotation position of the reflector to a position corresponding to the request position of the virtual image by rotating the stepper motor in an opposite direction by a changed rotation angle defined as a rotation angel that corresponds to a change in position of the virtual image from the request position to the reset position; and
   when:
   (a) the driver changes the request position of the virtual image into a new request position from a previous request position;
   (b) the stepper motor rotates the reflector to change the position of the virtual image from the previous request position to the new request position; and
   (c) the new request position is closer to the reset position than the previous request position is, the ignition switch is turned off,
   the controller, in response to the turn off of the ignition switch, rotates the stepper motor to change the position of the virtual image from the new request position to the reset position and then instructs the stepper motor to perform a reverse operation in advance of the subsequent turn on of the ignition switch,
   wherein the reverse operation, the stepper motor rotates only by a specified angle that corresponds to a predetermined difference between:
      the rotation position of the reflector just after the stepper motor rotates the reflector to change the position of the virtual image from the previous request position to the new request position, which is closer to the reset position than the previous request position is; and
      the rotation position of the reflector just after the stepper motor rotates the reflector to change the position of the virtual image from the new request position to the reset position and the stepper motor reversely rotates to change the position of the virtual image from the reset position to the new request position, wherein the predetermined difference, corresponds to a hysteresis generated at a time of a change in the rotation direction of the reflector between forward rotation and backward rotation.

2. The vehicular head-up display device according to claim 1, wherein the specified angle is a sum of a rotation angle that corresponds to a motor hysteresis generated at a time of when the rotation of the stepper motor is changed between forward rotation and backward rotation and a rotation angle that corresponds to other hystereses resulting from the force applied by the rotation direction spring, the force applied by the axis direction spring, and a weight of the reflector.

3. The vehicular head-up display device according to claim 1, wherein when:

(a) the driver changes the request position into the new request position from a previous request position;

(b) the stepper motor rotates the reflector to change the position of the virtual image from the previous request position to the new request position; and (c) the new request position is distant from the reset position than the previous request position is, the controller inhibits the reverse operation of the stepper motor in response to the turn off of the ignition switch.

4. The vehicular head-up display device according to claim 1, wherein the rotation direction spring applies the force to the rotary shaft in a direction that causes the request position to leave the reset position.

* * * * *